US009075694B2

(12) United States Patent
Mercer et al.

(10) Patent No.: US 9,075,694 B2
(45) Date of Patent: Jul. 7, 2015

(54) PROCESS EXECUTION COMPONENTS

(76) Inventors: Shane Andrew Mercer, Wellington (NZ); John Matthew Martin, Wellington (NZ); Lindsay Ian Smith, Wellington (NZ)

( * ) Notice: Subject to any disclaimer, the term of this patent is extended or adjusted under 35 U.S.C. 154(b) by 436 days.

(21) Appl. No.: 13/695,061

(22) PCT Filed: Apr. 27, 2011

(86) PCT No.: PCT/NZ2011/000061
§ 371 (c)(1),
(2), (4) Date: Oct. 29, 2012

(87) PCT Pub. No.: WO2011/139162
PCT Pub. Date: Nov. 10, 2011

(65) Prior Publication Data
US 2013/0055274 A1     Feb. 28, 2013

Related U.S. Application Data

(60) Provisional application No. 61/330,348, filed on May 1, 2010.

(51) Int. Cl.
G06F 9/44         (2006.01)
(52) U.S. Cl.
CPC ....................................... *G06F 8/71* (2013.01)
(58) Field of Classification Search
None
See application file for complete search history.

(56) References Cited

U.S. PATENT DOCUMENTS

| | | | | |
|---|---|---|---|---|
| 6,810,522 | B2 * | 10/2004 | Cook et al. | 719/316 |
| 2006/0161416 | A1 * | 7/2006 | Tramontana | 703/22 |
| 2009/0320137 | A1 * | 12/2009 | White et al. | 726/25 |
| 2010/0280631 | A1 * | 11/2010 | Lu et al. | 700/21 |
| 2011/0009991 | A1 * | 1/2011 | Dinicola et al. | 700/97 |
| 2012/0022669 | A1 * | 1/2012 | Forster | 700/19 |
| 2014/0046645 | A1 * | 2/2014 | White et al. | 703/13 |

* cited by examiner

*Primary Examiner* — Tuan Dao
(74) *Attorney, Agent, or Firm* — Bio Intellectual Property Services LLC (Bio IPS); O. (Sam) Zaghmout

(57) ABSTRACT

Automating processes in an automation platform. Specifying a program that when executed by the platform implements the process. The program including process description, process components. The description including component initialization instructions having input parameter(s) and initialized component execution instructions having an execution state. Components having an initialization interface, an execution interface, and at least one of simulation instructions and operation instructions. Components characterized by output parameters, and operative upon receiving input parameters via the initialization interface to initialize the component. Initialized components operative upon receiving an execution state via the execution interface to execute the initialized component in accordance with the execution state, and in absence of operation instructions, to return a simulated output in the format of the output parameters in accordance with the simulation instructions. Executing the instructions by initializing each component in accordance with the component initialization instructions, executing each initialized component in accordance with the instructions.

21 Claims, 4 Drawing Sheets

PROCESS EXECUTION COMPONENTS

CROSS REFERENCE TO RELATED APPLICATIONS

This application claims the benefit of U.S. Provisional Application No. 61/330,348 entitled "Process Execution Components" filed on May 1, 2010, and which is hereby expressly incorporated herein by reference in its entirety.

FIELD OF THE TECHNOLOGY

The technology of this disclosure relates to process automation. Implementations of the technology relate to process automation that enables assessment of the validity of an overall process description independent of final implementation details of process components called by the description when the process is automated on an automation platform.

DETAILED DESCRIPTION

Figure 1:
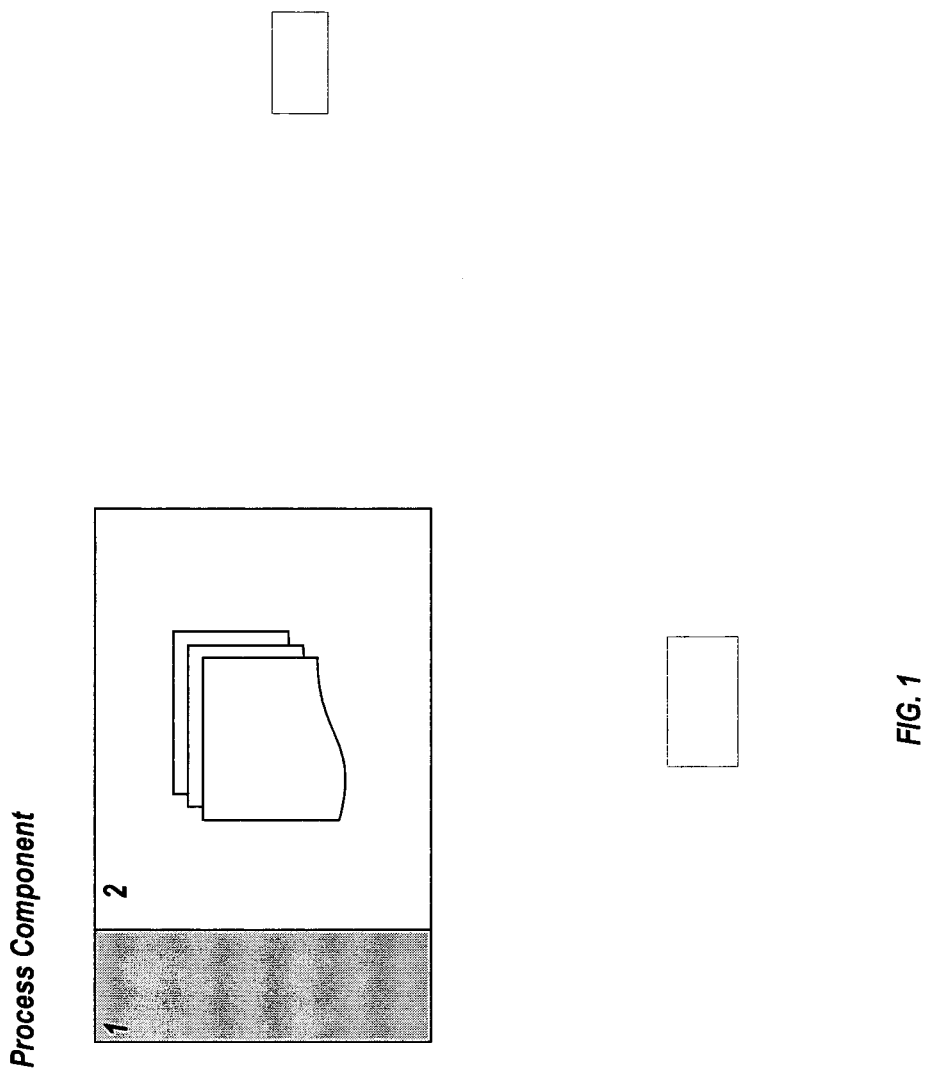
FIG. 1 illustrates a process component of the technology.

This technology relates to the field of automated process description. When automating a process in an automation platform, the automation platform must be provided with instructions from which its behavior is determined. It is important that the automation instructions correctly describe the process that is being automated.

In many instances, the correctness of the automation instructions can only be verified when all parts of that automation description (e.g., process description and the details of all process components) are complete. This can incur a high cost when the final process does not perform correctly as changes to the automation instructions may need to be made across many process components.

The technology disclosed herein (the "technology") includes computer-implemented methods, computer program products, and systems for structuring process descriptions, process components, and instructions so that the correctness of the process description can be verified before all process components have been constructed. The automation platform still is able to execute the process in a way that allows for validity to be assessed. The construction of individual process components can then be finished without modifying the overall process description, thus maintaining the correctness of the process description independent of the implementation of the process components.

The technology can include describing automated computer-implemented processes by: implementing process execution by composing it from individual executable process components with a specified interface; storing the components in a component store, retrievable by name; determining process execution by using automation instructions that refer to the names and execution parameters of process components; and allowing the implementation of process components to vary without altering the automation instructions.

'Process execution' in this specification refers to the implementation of a process in accordance with a process description by some automated platform.

'Process component' in this specification refers to a self-contained unit of execution that performs a discrete process task. Preferably, process execution occurs by execution of process components in accordance with the process description. The process components adhere to an interface specification that provides a way for process description to initiate execution of a process component. Process components can be composed of other process components used to perform their execution. Process components can perform execution in any available manner.

'Component store' in this specification refers to a catalogue for process components. Preferably, process components can be held in a component store; and the process components are assigned names. A process component can be retrieved from the component store by referring to the name. The central store also can hold any other relevant information about an process component. The component store can provide details about all the process components stored within it.

The component store allows for process components descriptions to be stored, and instances of the process components to be retrieved when the components are referenced from automation instructions. For example, the objects stored in the component store can be implemented as follows

```
public class StoredProcessComponent {
/**
 * Create a StoredProcessComponent. Requires the class
 * of the component so it can be created, and information
 * that describes the component.
 */
public StoredProcessComponent(Class componentClass,
ComponentInfo info) {
this._componentClass = componentClass;
this._componentInfo = info;
}
/**
 * Create a new process component of the stored class to be used in
 process
 * execution. The supplied initialization context is used to initializet the
 * component.
 */
public ProcessComponent createProcessComponent(InitializationContext
context) {
ProcessComponent newComponent =
this._componentClass.newInstance( );
newComponent.initialize(context);
return newComponent;
}
}
```

And the Component Store itself can be implemented by a class such as this:

```
public class ComponentStore {
/**
 * Create the component store. Initilize internal variables.
 */
public ComponentStore( ) {
// We store the components based on their name
this._componentMap = new HashMap( );
}
/**
 * Add a stored process component to this store under the given name
 */
public void addStoredProcessComponent(String componentName,
StoredProcessComponent storedProcessComponent) {
this._componentMap.put(componentName, storedProcessComponent);
}
```

```
/**
* Retrieve a stored process component by name
*/
public StoredProcessComponent findStoredProcessComponent(String
componentName) {
if (this._componentMap.contains(componentName)) {
return this._componentMap.get(componentName);
} else {
return null;
}
}
}
```

The component store can be filled from definition of process components found somewhere like a file system. For example given a folder structure like this:

```
components/
  email/
    definition.xml
  calculate-commission/
    definition.xml
```

Where the definition file contains the name of the class to use for the process component. This structure can be read and used to populate the component store in this way:

```
public class ComponentStorePopulator {
public ComponentStorePopulator(ComponentStore componentStore,
Directory componentsDirectory) {
this._componentStore = componentStore;
this._componentsDirectory = componentDirectory;
}
public void populateComponentStore( ) {
// For each directory in the componentsDirectory, load the component
for (Directory componentDirectory :
componentsDirectory.getAllDirectories( ))
{
loadComponentFromDirectory(componentDirectory);
}
}
public
void loadComponentFromDirectory(Directory componentDirectory) {
String componentName = componentDirectory.getName( );
File definitionFile = componentDirectory.getFile("definition.xml");
// Read the class name and info from the definit
String   componentClassName   =   getClassNameFromDefinition-
File(definitionFile);
ComponentInfo   componentInfo   =
getComponentInfoFromDefinition(definitionFile);
StoredProcessComponent   storedPC   =
new   StoredProcessComponent(componentClassName, componentINfo);
this._componentStore.addStoredProcessComponent(componentName,
storedPC);
}
}
```

'Automation Instructions' in this specification refers to data that forms the instructions for directing process execution. Preferably, some automation instructions contain the names of process components to execute. The automation instructions can contain execution parameters for the named process components. The structure and order of the automation instructions indicates the order and structure of process execution. The process components themselves can contain automation instructions used to determine their process execution. Automation Instructions could be described using XML. In the following example the process is retrieving sales data, and calculating the commission on the sales by totaling the sales.

```
<process>
  <retrieve-sales-data dataset="sales-data"/>
  <set-value field="var.total" value="0"/>
  <for-each-item dataset="sales-data">
    <set-value value="var.total" value="{$var.value} +
    {$sales-data.amount}"/>
  </for-each-sales-item>
  <calculate-commission source="var.total" destination=
  "var.commission"/>
  <save-sales-commission field="var.commission"/>
</process>
```

These automation instructions could be transformed into actual process components in the following way:

```
public class ProcessCreator {
public ProcessCreator(File automationFile,
ComponentStore componentStore) {
this._automationFile = automationFile;
this._componentStore = componentStore;
}
public ProcessComponent createProcessComponentFromFile( ) {
// Read the file, turning each XML element into a process component
// by looking it up in the component store
Node documentNode = parseXMLToDomNode(this._automationFile)'
return createProcessComponentFromNode(documentNode);
}
private ProcessComponent
createProcessComponentFromNode(Node node) {
String componentName = node.getName( );
Attributes attributes = node.getAttributes( );
ProcessComponentList children = processChildren(node);
InitializationContext initCtx =
new InitializationContext(attributes, children);
StoredProcessComponent   storedProcessComponent   =
this._componentStore.findStoredProcessComponent(componentName);
ProcessComponent   processComponent   =
storedProcessComponent.createProcessComponent(initCtx);
return processComponent;
}
private ProcessComponentList processChildren(Node node) {
NodeList childNodes = node.getAllChildren( );
ProcessComponentList result = new ProcessComponentList( );
for (Node n in childNodes) {
result.add(createProcessComponent(n));
}
return result;
}
}
```

The 'implementation' of a process component in this specification refers to the design of that process component relating to the behavior of that component during process execution. Preferably, process components can have their implementation altered at any time; and, absent a change in the interface specification for the component, the specific implementation of a process component will not affect the way that the component is referred to in the automation instructions.

As after the process components have been created, the process described above can be invoked as follows to retrieve the component for a particular automation process, or create it, or return a pre-created process.

```
ProcessComponent component = getComponentForProcess("commission-
calculation");
ExecutionState state = new ExecutionState( );
component.execute(state)
```

In implementations of the technology, initializing can occur when the automation instructions are read, in order to create the process components. It can happen ahead of the time that the process is executed, e.g., substantially prior to execution time, including when the automation instructions are changed or the process components are changed. The InitializationContext contains the input parameters as specified in the automation instructions.

In implementation of the technology, during execution an execution state can be passed to the process component. The execution state can include information about the currently execution process—local values, environment information etc. A given set of automation instructions, transformed into process components, can be executed multiple times, each time having the execute method called with a different execution state.

Figure 2:
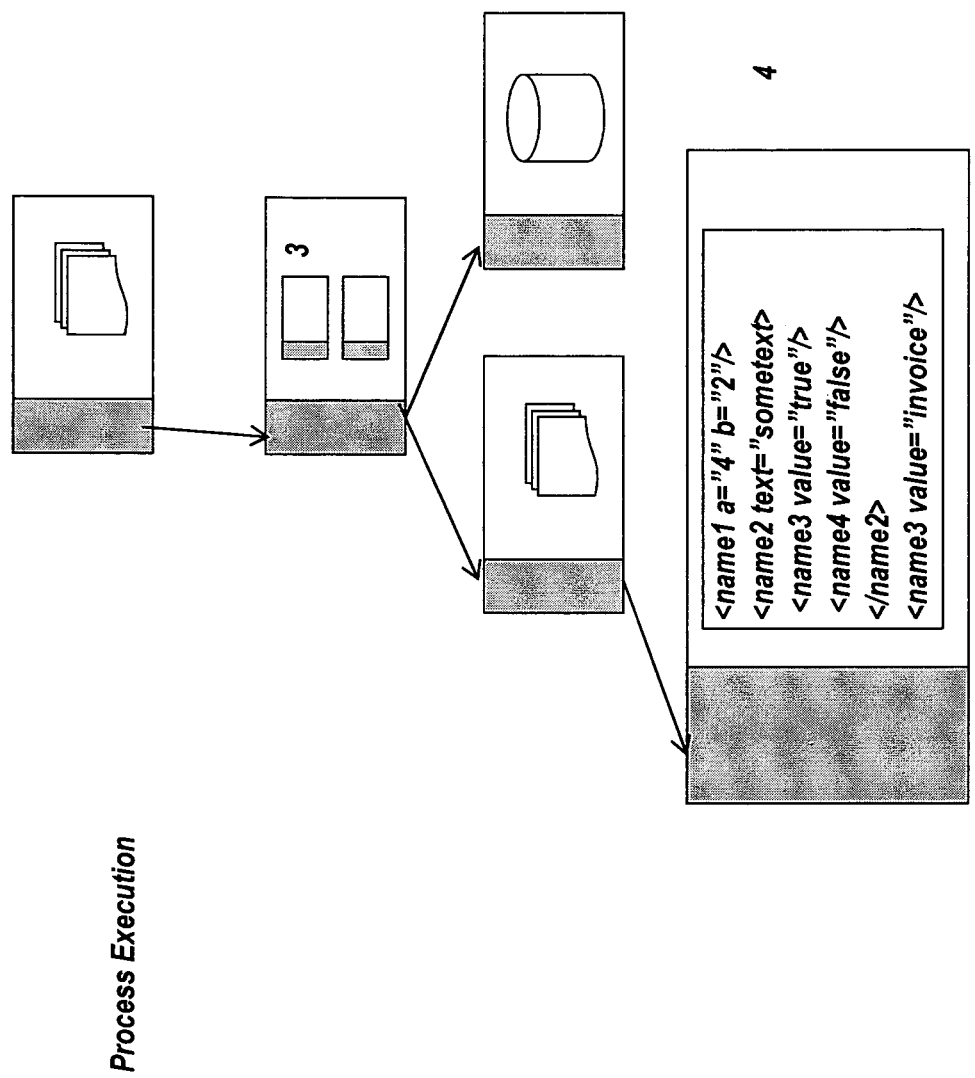
FIG. 2 illustrates a sample process execution of the technology.

Referring to FIG. 1 and FIG. 2, FIG. 1 is a diagram of a process component is shown. The process component is formed of two parts: the interface to process execution 1, and the implementation of that process component 2. The implementation of a process component can be achieved in many ways, including being composed of other process components 3, or by containing its own execution instructions 4. FIG. 2 illustrates a nature of process execution. Each process component involved in execution participates in execution, where the automation platform initiates execution of each component through its execution interface. Process execution can take different paths depending on the data involved in execution, and the automation platform is not aware of the implementation of the process components involved in execution.

Figure 3:
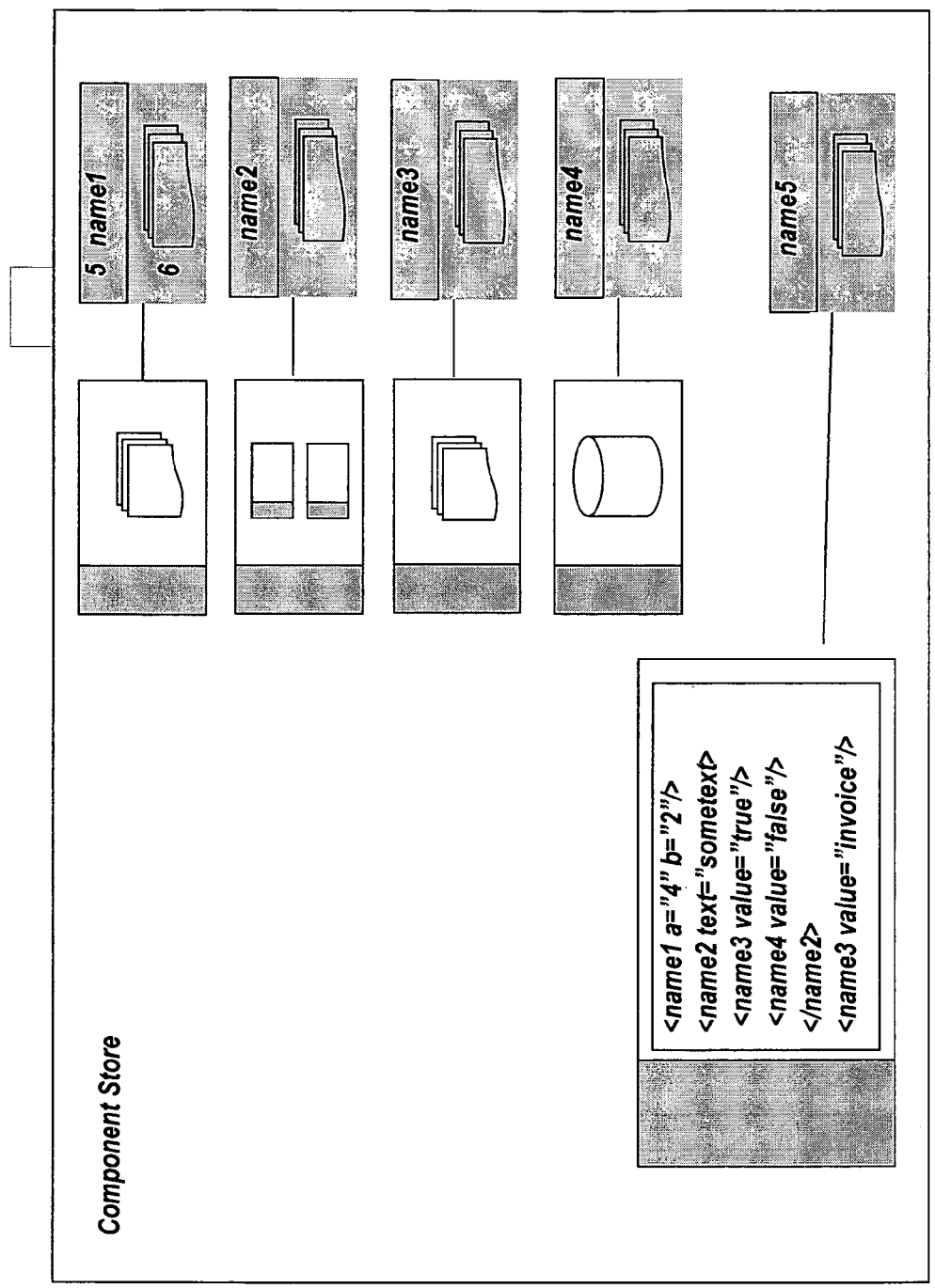
FIG. 3 illustrates a sample component store of the technology.

Referring to FIG. 3, a component store is shown. Process components can be stored, referenced with a unique name 5, and other additional information about that component 6.

Automation instructions are data that reference process components by name and can include parameter data for that component. The automation instructions describe to the automation platform the process components required to execute the automated process. Example automation instructions include:

```
<name1 a="4" b="2"/>
<name2 text="sometext">
  <name3 value="true"/>
  <name4 value="false"/>
</name2>
<name5 value="invoice"/>
```

This technology relates to structuring automated processes for execution in automation platforms. One example of an automated process execution platform is a computer system that is used to implement a business process. In particular, this technology provides a way for the automated process to be described and verified before implementation of all the constituent parts of that process have been completed.

In some known technologies, verification that an automated process is correct is only possible when the automated process has been completed. All the components of that automated process usually need to be fully constructed so that the system can execute the process and the results verified by those familiar with that process. This is risky and often costly because if omissions or mistakes are found in the final process implementation, then parts of the process implementations may need to be rebuilt to match the desired behaviour.

This is particularly prevalent when the process requirements are not completely understood during the construction of the automated process. This is often the case for automation of business processes, as the process experts are not knowledgeable in the details of the final implementation platform. The engineers working on the process automation must build a working system in order for the process experts to verify that it meets their needs.

This technology describes a way that the description of the process automation can be achieved while allowing for process components to remain incomplete—but still providing the means for execution of that process to allow verification by the process experts.

In this technology, process execution on the automated process platform (such as a computer system) is modeled as execution of multiple process components. Process execution can execute a list of process components in order, or can execute some process components in one situation, and another list in a different situation. Process automation could be used, for example, to send an invoice to a client, or to gather data from a customer via a web form, or to calculate expenditure totals for a month.

Process execution interacts with each process component through an execution interface. This interface allows the automation platform to initiate execution of a process component, without understanding the manner in which that component will perform the requested execution.

A process component forms a building block of an automated process. For example, a process component can be designed for calculating the sum of a set of numbers, or for the job of displaying a particular screen to the user, or to apply a business rule to some data. A process component can implement its designated role in any way it chooses. It can execute internal instructions to do so, or can be composed of other process components, or can defer to some external system to perform the required job.

A process component can be characterized by an interface that each component adheres to. For example, the following interface specification allows the process description to initialize the component based on the way the component is referenced in the automation instructions. In this example the "initCtx" parameter holds information regarding any parameters from the automation instructions. The interface specification also allows the process description to execute the component by specifying an execution state. The implementation details are the responsibility of the process component.

```
public interface ProcessComponent {public void
    initialize(InitializationContext
    initCtx); public void execute(ExecutionState state);
```

The implementation of a process component then uses this interface in order to achieve some task. For example, a process component for sending an email can be implemented like this:

```
public class EmailComponent implements ProcessComponent {
    public EmailComponent( ) { }
    public void initialize(InitializationContext initCtx) {
        // Read the email address and email body from the init context
        this._emailAddress = initCtx.getAttribute("address");
        this._emailBody = initCtx.getAttribute("text");
    }
    public void execute(ExecutionState state) {
        // Send the email. Use the email server configured for use in this
        // ExecutionState
        EmailServer server = state.getCurrentEmailServer( );
        server.sendEmail(this._emailAddress, this._emailBody);
    }
}
```

A process component for the calculation of some business rule, such as the commission on a sale can be:

```
public class CalculateCommission implements ProcessComponent {
public CalculateCommission( ) { }
public void initialize(InitializationContext initCtx) {
this._sourceField = initCtx.getField("source");
this._destinationField = initCtx.getField("destination");
}
public void execute(ExecutionState state) {
// Get the value from the sourceField, multiply by the
// commission rate, and put it in the destination.
Number value = Number.parseFrom(state.getValue(this._sourceField));
// Commission is 10%
Number result = value * 0.1;
state.setValue(this._destinationField, result);
}
}
```

A process component that itself contains other process components can be written like this.

```
public class RepeatProcesses implements ProcessComponent {
    public RepeatProcesses( ) { }
    public void initalize(InitializationContext initCtx) {
    this._repeatTimes = initCtx.getField("iterations");
    // Retrieve the process components inside us
    this._componentsToRepeat = initCtx.getInnerProcessComponents( );
    }
    public void execute(ExecutionState state) {
    // Execute all the inner components the set number of times
    for (int i = 0; i < this._repeatTimes) {
    this._componentsToRepeat.executeAll(state);
    }
    }
}
```

The process component store forms a repository for process components. It stores process components, cataloguing them by a name, along with descriptive information about that process component. The store allows components to be retrieved by the name, and can provide list of the components currently stored within it. The descriptive information can contain details about the role of the process component, or the author, or anything else that may be useful to know about that component.

By having a repository for process components external to the execution environment, it facilitates the process of implementing and evolving the process components independently of process execution. Process components can be built, shared and re-used independent of any specific automated process.

The link between process execution, the process components, and the component store is the use of automation instructions. Automation instructions are structured data that describe to the automation platform the steps required to implement a process and the order in which to perform them. For example, an XML file is an example of structured data that could be used as the source of these instructions. The automation instructions refer to the names of the process components that are executed, and can provide parameterization data that can alter some aspect of the process component's execution for a specific instruction. For example, this parameterization information can specify the text to display to a user at one point in the process.

The execution platform reads the automation instructions and executes the process components referred to by those instructions based on the order that they are specified and the parameters supplied. In this way the automation instructions form the basis for the implementation of a given process by the automation platform. By using this descriptive mechanism for determining process execution, it provides a document whose contents can be verified by both process implementers and process experts.

Process components can implement their designed functionality in any way without affecting the way in which they are referred to by the automation instructions. As example, this allows a process component to implement its required functionality from some high-level description of what that functionality is. A process component required to retrieve data from an external system could be given a description of the format of the external data, and could return data in that format, e.g., simulated results, in lieu of actually connecting to the external system. When a system is being designed, this will be enough to provide a functioning system that has the appearance of being complete, without having to spend the time and money on engineering the actual external connection.

The automation instructions do not vary if the process component implementations change. The automation instructions can be designed, reasoned about, verified by the experts, and executed before process components are complete. This is achievable because the execution platform only interacts with the process components through the common interface. A functioning system can be demonstrated to the process experts and feedback and verification can be obtained before committing to the implementation of the remaining components.

This approach allows a 'breath-first' approach to process automation where the automation designers can design the entire range of process functionality and elicit valuable feedback from the process experts much sooner than systems built in the current state of the art.

While a process utilising incomplete process components is not functioning exactly as it would when all the components are complete, the execution of that process will demonstrate behaviour that falls within the boundaries of the possible behaviour of the completed system.

Once the process is verified, the implementations of the process components can be completed with a greatly reduced risk of the work having to be modified later. A process component contained in the component store can be interchanged for the newer version that provides the complete functionality. Because the automation instructions only refer to the name of the component, and because execution only interacts with the components through the execution interface, the automation instructions do not need to be modified are so are still valid for the process being automated.

This technology provides a way to reduce the cost and risk of building automating processes by providing a way to describe and execute an automated process well in advance of finalizing all the functionality of the constituent parts of that process. It provides significant benefit to automated process builders by allowing them to reduce the risk and cost of building a system that fulfils the requirements of the process experts.

The present technology can take the forms of hardware, software or both hardware and software elements. In some implementations, the technology is implemented in software, which includes but is not limited to firmware, resident software, microcode, a Field Programmable Gate Array (FPGA), graphics processing unit (GPU), or Application-Specific Integrated Circuit (ASIC), etc. In particular, for real-time or near real-time use, an FPGA or GPU implementation would be desirable.

Furthermore, portions of the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be non-transitory (e.g., an electronic, magnetic, optical, electromagnetic, infrared, or semiconductor system (or apparatus or device)) or transitory (e.g., a propagation medium). Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CDROM), compact disk—read/write (CD-R/W) and DVD. Both processors and program code for implementing each as aspect of the technology can be centralized or distributed (or a combination thereof) as known to those skilled in the art.

Figure 4:
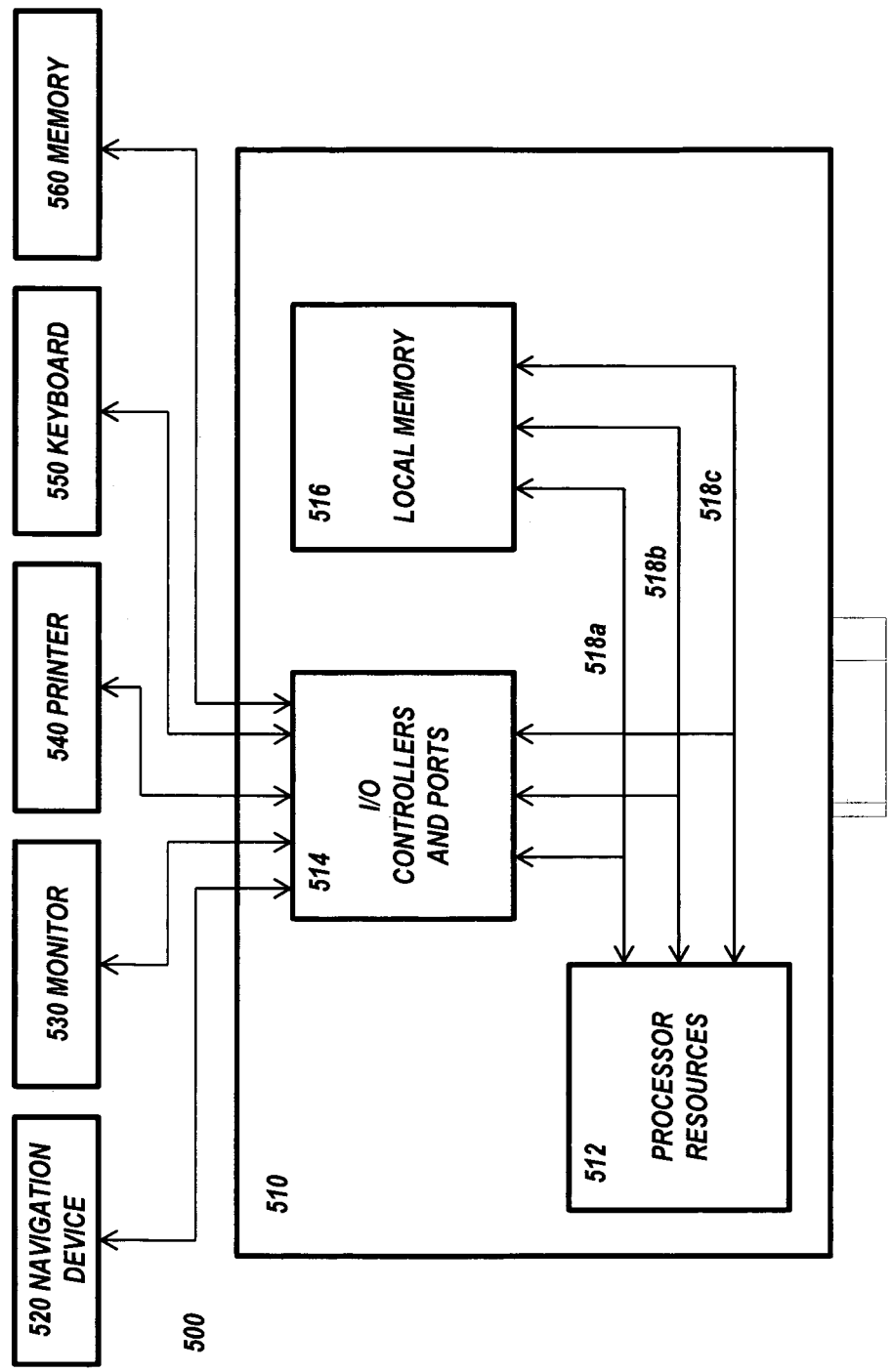
FIG. 4 illustrates a data processing system that can be part of an automation platform of the present technology.

Referring to FIG. 4, a data processing system (e.g., 500) suitable for storing a computer program product of the present technology and for executing the program code of the computer program product can include at least one processor (e.g., processor resources 512) coupled directly or indirectly to memory elements through a system bus (e.g., 518 comprising data bus 518a, address bus 518b, and control bus 518c). The memory elements can include local memory (e.g., 516) employed during actual execution of the program code, bulk storage (e.g., 560), and cache memories (e.g., including cache memory as part of local memory or integrated into processor resources) that provide temporary storage of at least some program code in order to reduce the number of times code must be retrieved from bulk storage during execution. Input/output or I/O devices (including but not limited to keyboards 550, displays 530, pointing devices 520, etc.) can be coupled to the system either directly or through intervening I/O controllers (e.g., 514). Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A method for automating a process in an automation platform, the method comprising:
    specifying a program that when executed by the automation platform implements the process, the program comprising a process description, and at least one process component;
        the process description comprising automation instructions, including:
            process component initialization automation instructions comprising at least one input parameter, and
            initialized process component execution automation instructions comprising an execution state;
        each process component:
            comprising an initialization interface, an execution interface, and at least one of simulation instructions and operation instructions,
            characterized by output parameters, and
            operative upon receiving input parameters via the initialization interface to initialize the process component,
        each initialized process component operative upon receiving an execution state via the execution interface to:
            execute the initialized process component in accordance with the execution state, and
            in the absence of operation instructions, to return a simulated output in the format of the output parameters in accordance with the simulation instructions; and
    executing the automation instructions, comprising:
        initializing each process component in accordance with the process component initialization automation instructions, and
        executing each initialized process component in accordance with the process automation instructions.

2. The method of claim 1 wherein each process component is stored in a common component store.

3. The method of claim 2 wherein the component store catalogs each process component by at least name, input parameters, and output parameters.

4. The method of claim 1, at least one process component further comprising at least one further process component.

5. The method of claim 1, wherein initializing each process component occurs substantially prior to execution of each initialized process component.

6. The method of claim 1, wherein execution state comprises at least one of local values and environment information.

7. The method of claim 1, wherein executing each initialized process component in accordance with the process automation instructions comprises executing at least one initialized process component a plurality of times.

8. A computer program product for automating a process in an automation platform, the computer program product comprising:
    tangible non-transitory computer readable storage media; and
    a program stored on the media;
    the program, when executed by an automation platform, implements the process;
    the program comprising a process description, and at least one process component;
        the process description comprising automation instructions, including:
            process component initialization automation instructions comprising at least one input parameter, and
            initialized process component execution automation instructions comprising an execution state;
        each process component:
            comprising an initialization interface, an execution interface, and at least one of simulation instructions and operation instructions,
            characterized by output parameters, and
            operative upon receiving input parameters via the initialization interface to initialize the process component,
        each initialized process component operative upon receiving an execution state via the execution interface to:
            execute the initialized process component in accordance with the execution state, and in the absence of operation instructions, to return a simulated output in the format of the output parameters in accordance with the simulation instructions; and executing the automation instructions, comprising:
- initializing each process component in accordance with the process component initialization automation instructions, and
- executing each initialized process component in accordance with the process automation instructions.

9. The computer program product of claim 8 wherein each process component is stored in a common component store.

10. The computer program product of claim 9 wherein the component store catalogs each process component by at least name, input parameters, and output parameters.

11. The computer program product of claim 8, at least one process component further comprising at least one further process component.

12. The computer program product of claim 8, wherein initializing each process component occurs substantially prior to execution of each initialized process component.

13. The computer program product of claim 8, wherein execution state comprises at least one of local values and environment information.

14. The computer program product of claim 8, wherein executing each initialized process component in accordance with the process automation instructions comprises executing at least one initialized process component a plurality of times.

15. A system for automating a process, the automation platform comprising:
- an automation platform,
- tangible non-transitory computer readable storage media; and
- a program stored on the media;
- the program, when executed by the automation platform, is operative to implement the process;
- the program comprising a process description, and at least one process component;
  - the process description comprising automation instructions, including:
    - process component initialization automation instructions comprising at least one input parameter, and
    - initialized process component execution automation instructions comprising an execution state;
  - each process component:
    - comprising an initialization interface, an execution interface, and at least one of simulation instructions and operation instructions,
    - characterized by output parameters, and
    - operative upon receiving input parameters via the initialization interface to initialize the process component,
  - each initialized process component operative upon receiving an execution state via the execution interface to:
    - execute the initialized process component in accordance with the execution state, and
    - in the absence of operation instructions, to return a simulated output in the format of the output parameters in accordance with the simulation instructions; and
  - executing the automation instructions, comprising:
    - initializing each process component in accordance with the process component initialization automation instructions, and
    - executing each initialized process component in accordance with the process automation instructions.

16. The system of claim 15 wherein each process component is stored in a common component store.

17. The system of claim 16 wherein the component store catalogs each process component by at least name, input parameters, and output parameters.

18. The system of claim 15, at least one process component further comprising at least one further process component.

19. The system of claim 15, wherein initializing each process component occurs substantially prior to execution of each initialized process component.

20. The system of claim 15, wherein execution state comprises at least one of local values and environment information.

21. The system of claim 15, wherein executing each initialized process component in accordance with the process automation instructions comprises executing at least one initialized process component a plurality of times.

* * * * *